US006848219B2

(12) United States Patent
Standard et al.

(10) Patent No.: US 6,848,219 B2
(45) Date of Patent: Feb. 1, 2005

(54) INTEGRATED, ADAPTABLE THEATER, CLUB AND MULTIPLEX

(75) Inventors: Gary Standard, Corona Del Mar, CA (US); Carl McMillan, Newport Beach, CA (US); Gregg Whitaker, Newport Beach, CA (US); Lou Weiss, Laguna Beach, CA (US); Jeff Long, Pine Mountain, CA (US); Russ Standard, Newport Beach, CA (US); Lee Standard, Costa Mesa, CA (US)

(73) Assignee: Worldstage LLC, Tustin, CA (US)

( * ) Notice: Subject to any disclaimer, the term of this patent is extended or adjusted under 35 U.S.C. 154(b) by 0 days.

(21) Appl. No.: 10/090,505

(22) Filed: Feb. 26, 2002

(65) Prior Publication Data

US 2002/0135739 A1 Sep. 26, 2002

Related U.S. Application Data

(60) Provisional application No. 60/271,527, filed on Feb. 26, 2001.

(51) Int. Cl.[7] .............................................. E04H 3/10
(52) U.S. Cl. .............................................. 52/6; 472/75
(58) Field of Search ................................ 52/6, 7, 8–10; 472/57, 61, 75, 77, 81

(56) References Cited

U.S. PATENT DOCUMENTS 3,399,887 A * 9/1968 Altier ................................ 52/7

| 3,685,220 A | | 8/1972 | Morrison |
| 3,754,756 A | * | 8/1973 | Szigety ........................ 272/21 |
| 4,885,878 A | | 12/1989 | Wuu |
| 4,962,420 A | * | 10/1990 | Judenich ...................... 358/60 |
| 5,026,152 A | * | 6/1991 | Sharkey ....................... 352/85 |
| 5,063,574 A | | 11/1991 | Moose |
| 5,205,101 A | | 4/1993 | Swan et al. |
| 5,218,388 A | | 6/1993 | Purdy |
| 5,469,669 A | | 11/1995 | Alter |
| 5,742,644 A | | 4/1998 | Campana, Jr. |
| 5,833,544 A | * | 11/1998 | Corbin et al. ................. 472/79 |
| 5,890,323 A | * | 4/1999 | Errato ............................. 52/6 |
| 6,164,018 A | | 12/2000 | Runge et al. |
| 6,587,159 B1 | * | 7/2003 | Dewald ...................... 348/744 |

OTHER PUBLICATIONS

"Pirates Dinner Adventure", 2001, Orlando, Florida.*

* cited by examiner

Primary Examiner—Naoko Slack
(74) Attorney, Agent, or Firm—Knobbe, Martens, Olson & Bear LLP

(57) ABSTRACT

The present invention advantageously provides an enhanced event-based theater going experience. In particular, one embodiment of the present invention enables pre-recorded videos of live performances, such as concerts, to be reproduced with great realism and encourages theater attendees to act or feel more as participants and less as passive viewers. The theater optionally comprises a projection screen, a projection room, seating, a dance area, an MC (master of ceremonies) station, changeable scenic designs, special effects equipment, food services and/or a bar.

12 Claims, 10 Drawing Sheets

INTEGRATED, ADAPTABLE THEATER, CLUB AND MULTIPLEX

REFERENCE TO RELATED APPLICATION

The present application claims priority benefit under 35 U.S.C. § 119(e) from U.S. Provisional Application No. 60/271,527, filed Feb. 26, 2001, entitled "Integrated, Adaptable Theater and Multiplex." The present application incorporates the foregoing disclosure herein by reference in its entirety.

BACKGROUND OF THE INVENTION

1. Field of the Invention

The present invention is related to entertainment facilities, and in particular, to theaters, clubs and multiplexes.

2. Description of the Related Art

While movies are a popular form of entertainment, home viewing of movies using VCR players, DVD players, and pay-per-view over cable, as well as competing forms of entertainment, such as sporting events, concerts, and computer games, are attracting consumers away from movie theaters.

Attempts have been made to boost movie theater attendance, by making theater attendance more pleasurable. For example, at many movie theaters, customers can now pre-purchase tickets to avoid waiting in line at the theater and to eliminate the possibility of arriving at the theater only to find that the movie is sold-out. Stadium seating has been incorporated into movie theaters to provide better sight lines. In addition, theater sound systems have been improved to provide more realistic sound reproduction. However, despite these attempts to improve the movie going experience, insufficient numbers of consumers are viewing movies in theaters. Hence, many movie theaters are underutilized, resulting in financial difficulties for theater chain owners.

In addition, conventional theaters have failed to provide an adequately exciting environment for the viewing of certain types of entertainment content. For example, one reason that concert films are often not sufficiently successful at the box office is that passive viewing of a concert film at a movie theater fails to approach the excitement and immediacy of an in-person live performance.

Hence, what is needed is entertainment that will attract more customers into movie theaters, thereby increasing theater usage and customer enjoyment.

SUMMARY OF THE INVENTION

The present invention advantageously provides an exciting, realistic, event-based theater going experience using an integrated, adaptable theater auditorium. In contrast to conventional movie theaters, which are designed for passive viewing of conventional movies while sitting quietly in a fully darkened theater, the novel theater in accordance with the present invention makes patrons feel as if they are participants in a live, dynamic event. Rather than merely showing conventional movies, a theater in accordance with the present invention can be used to screen and fully exploit videos intended to be used in conjunction with the theater to simulate or recreate live events and to provide additional experiences and features not available at a typical live event. Optionally, the use of a theater in accordance with the present invention can be dedicated to showing such videos.

One embodiment of a theater in accordance with the present invention includes, in addition to conventional movie theater elements, one or more of a dance area, a mosh pit, a merchandise area, a master of ceremonies station, a cocktail lounge, a bar, and/or a dining area. In addition, a performance area in front of a projection screen can be provided on which entertainers can perform before, during, and after on-screen presentations.

The theater may be changeably configured with scenic designs so that the auditorium interior does not appear like a movie theater interior. In one embodiment, scenery, backdrops, props, lights, speakers, projectors, and the like may be supported and movably positioned utilizing a support system that may be coupled to one or more walls or the ceiling, and motorized positioning equipment. The scenic design can be coordinated with a theme of the media content being screened.

To make the event appear even more realistic, special effects coordinated with the screened presentation are optionally provided. The special effects can include, by way of example, lasers, smoke generators, odor generators, mist generators, rain machines, snow machines, and the like.

To further enhance the theater-going experience, assigned seating may be provided so that consumers do not have to worry about arriving early to get a good seat or be concerned about not sitting together. In addition, concessions typically of a live event are optionally provided. For example, while seated in the theater, a customer can order from a service person food, drinks, or souvenir items related to the current presentation. The service person will then bring the ordered food and other items to the customer. Alternatively, an electronic terminal may be provided at each seat from which customers can order food or other items from a menu displayed on the terminal.

The theater can be networked to a digital video distribution system, wherein videos are transmitted digitally to the theater and projected using a digital video projection system. Optionally, the projection system can be a high definition system, providing resolutions in excess of 1280×1024 pixels, though other resolutions may be used as well. In addition, the theater might include a surround sound system to further enhance the realism of presentations presented in the theater. The theater might have seat shakers installed in each seat, or in premium seats, to further enhance the low frequency sound and to simulate other motion as part of the presentation.

In one embodiment, a modified movie theater having a projection screen is provided which includes a digital projector configured to project digital image sequences onto the projection screen, a plurality of seats positioned between the projection screen and the digital projector, at least a first support structure positioned above the plurality of seats, a plurality of special effects systems connected to the first support structure and configured to operate during the projection of the image sequences and in synchronization with the image sequences so as to simulate being present at a live event, and a communal area positioned between the projection screen and the plurality of seats and configured to provide an open space for people to dance.

In one embodiment, an entertainment venue configured to be adapted to emulate other entertainment venues is provided which includes a projection screen, a projector configured to project image sequences onto the projection screen, a plurality of seats reconfigurably positioned in front of the projection screen, at least a first support structure positioned higher then the plurality of seats, and a plurality of special effects systems connected to the at least a first support structure and configured to operate during the projection of the image sequences and in synchronization with the image sequences so as to simulate being present at an event at a different entertainment venue.

In one embodiment, a method of modifying a movie theater is provided which includes coupling a truss system to a first theater wall, coupling motorized lights to the truss system, coupling a special effects device to the truss system, positioning props in the movie theater, the props corresponding to a video sequence that is to be shown in the movie theater, and synchronizing the motorized lights and the special effects device to data stored in the video sequence.

In one embodiment, a distribution system is provided which includes a server configured to receive an encrypted digital data stream, a decryption module configured to decrypt the encrypted digital data stream to produce a digital data stream, and a decoder configured to parse the digital data stream into a digital audio stream and a digital video stream and to send the digital video stream to a digital video projector. The distribution system might also include a digital-to-analog converter configured to receive a first portion of the digital audio stream and to convert the first portion of the digital audio stream to analog audio, and a decoder configured to receive a second portion of the digital audio stream, to extract a DMX code from the second portion of the digital audio stream, and to send the DMX code to equipment.

In one embodiment, a DMX encoder is provided which includes a DMX input port configured to receive a DMX data stream having DMX data, a level shifter configured to shift the DMX data stream to a TTL level, and a universal asynchronous receiver and transmitter configured to format the DMX data stream into a plurality of packets. The DMX encoder further includes a digital signal processor configured to insert the plurality of packets into an AES digital audio stream to produce an encoded data stream carrying the DMX data, an AES formatter configured to shift the encoded data stream to an unbalanced AES digital audio stream, and a transformer configured to transform the unbalanced AES digital audio stream to a balanced AES digital audio stream.

In one embodiment, a DMX decoder is provided which includes an AES formatter configured to receive an AES digital audio stream having a cyclic redundancy code code and DMX data, and a digital signal processor configured to receive the AES digital audio stream, to determine whether the cyclic redundancy code code is valid, and to extract the DMX data from the AES digital audio stream if the cyclic redundancy code code is valid and to retrieve stored DMX data if the cyclic redundancy code code is not valid. The DMX decoder further includes a universal asynchronous receiver and transmitter configured to receive the DMX data, and a level shifter configured to shift the DMX data to a DMX output level.

DETAILED DESCRIPTION OF PREFERRED EMBODIMENTS

The present invention has applicability in the field of entertainment in general. For illustrative purposes, however, the following description pertains to theaters, clubs or other venues of entertainment. To facilitate a complete understanding of the present invention, the remainder of the detailed description describes the present invention with reference to the drawings, wherein like reference numbers are referenced with like numerals throughout.

The present invention advantageously provides an enhanced, event-based theater going experience. As will be described in greater detail below, one embodiment of the present invention enables live and/or pre-recorded videos of live performances, such as music concerts, to be reproduced with great realism and encourages theater attendees to act and feel more as participants and less as passive viewers. Further, theaters configured in accordance with the present invention enable customers to experience realistic, exciting, pre-recorded concerts, including behind the scenes footage, in the comfort and safety of a local movie theater. The present invention has combined elements from live events with elements from theaters, clubs or other venues of entertainment. Advantageously, in addition to screening concerts, the theater may be used to exhibit pre-recorded or remote live sporting events, business presentations, educational seminars, Broadway shows, plays, operas, religious events, and cultural events. In addition, national or history making events, such as coronations, royal weddings, inaugurations, state funerals, can be remotely presented in the theater, thereby providing a group setting for remotely participating in such important events. These events can be broadcast across the world.

Figure 1:
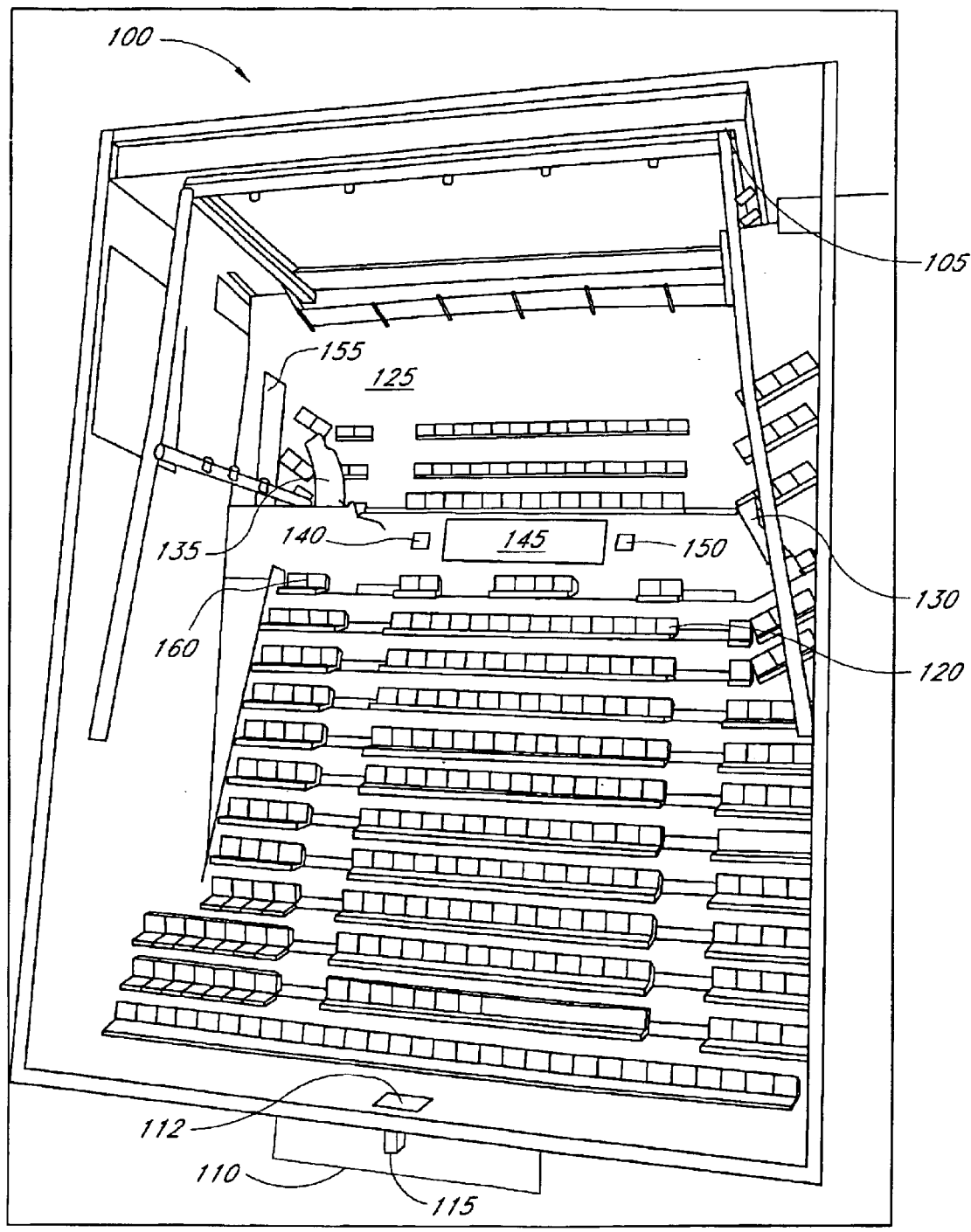
FIG. 1 is a perspective view of a theater, club or auditorium according to one aspect of the present invention.

FIG. 1 is a perspective view of a theater, club or auditorium 100 according to one aspect of the present invention. The theater 100 includes a projection screen 105, a projection room 110 having a projection window 112 and a projector 115, seats 120, which optionally may be retractable and re-configurable, a communal area 125, an MC (master of ceremonies) station 130, and a cocktail lounge and/or a bar 135. Of course, in other embodiments, not all of the theater elements need to be included and some elements, such as the bar 135 or the MC station 130 may be removable.

The projector 115 is located in the projection room 110 and is positioned so that the video is projected through the projection window 112 and onto the projection screen 105. Optionally, the projector 115, or a portion thereof, is mounted on a movable platform so that the projector 115 can be easily moved to accommodate reconfigurations of the shape and size of the theater 100. The projector 115 can be a digital video projector, a movie projector or a conventional video projection system. By way of example, the digital video projector 115 can use direct-drive image light amplification, a reflective liquid crystal implementation in which electronic signals are directly addressed to the liquid crystal. In another example, the digital video projector 115 can be implemented using digital micro mirror devices. In another example, the digital video projector's light source is a laser. Preferably, the digital video projector 115 provides at least enough brightness to meet the 12-foot lamberts on-screen Society of Motion Picture and Television Engineers (SMPTE) film standard, though other brightness levels may be used as well. Optionally, the projection system can be a high definition system, providing resolutions of 1280× 1024 pixels or even more.

In one embodiment, the seats 120 are arranged in parallel rows. In addition, a performance stage (not shown) is optionally positioned in front of the screen 105. The stage can be interchangeable with the communal area 125 or can be provided in addition to the communal area 125 by being positioned between the screen 105 and the communal area 125. The stage may be used to provide a performance area for live entertainers, such as dancers, who perform before, during, and after the screened show to add more of a human presence to the screened presentation. The communal area 125 (sometimes referred to as a mosh pit) is a defined area directly in front of the screen 105 on which a concert or a movie is being displayed, where people can gather and dance in time to the music, adding excitement to the performance. Optionally, the communal area 125 is located at the back of the theater 100 behind the last row of seats 120. The communal area 125 can also have a plurality of phone or television jacks. The phone jacks can be used to connect to the Internet or to make phone calls to place bets on events such as boxing, horse racing, basketball and football games.

In addition, the theater 100 may optionally include a dining area 140, including tables 145 and chairs 150, where diners can enjoy a meal while viewing a video, a pre-recorded or remote concert, a pre-recorded play, or the like. In the theater 100, some or all of the seats 120 can also be replaced with tables 145 and chairs 150 to enhance the dining and viewing experience.

The theater 100 may further include a concession stand 155 so that customers can order food, alcoholic and/or non-alcoholic drinks, merchandise such as shirts, jackets, hats, souvenir items or novelties related to the show being viewed, and have the item delivered to their seats 120. Optionally, a terminal 160 may be provided at each seat 120 from which customers can order food or other items from a menu displayed on the terminal 160. The terminal 160 can include a card swipe, which can be used by the customer to pay for the ordered items. The terminal 160 may be mounted on an arm rest of each seat 120 or on the back of each seat 120 and is networked to a terminal in a theater kitchen, which can display the customer's order. The terminal 160 may alternatively be used as a audience response system connected to a central server.

To further make the entertainment experience more pleasurable and less stressful, customers can optionally be able to reserve assigned seating within the theater 100. Therefore, the customer does not have to arrive early to be ensured a good seat or to keep their party together. The customer may optionally be charged a premium to reserve an assigned seat. In one embodiment, if the customer has an assigned seat, the customer can put the ordered food on a "tab," where for a given showing, the seat is associated with the customer's credit card and the tab will be billed to the credit card. In addition, if the customer has an assigned seat, the customer can pre-order food or other items over the phone, by mail, or via the Internet before arriving at the show. The customer can further specify how long after the start of the film the food should be brought to the customer. Once the customer arrives at the theater 100, the food or other items will be brought to the customer in accordance with the customer's instructions. For convenience, a retractable eating tray can be stored within the customer's seat armrest or a tray can be lowered from the seat in front of the customer.

Tie-ins with the on-screen presentation being presented may be provided. For example, promotional items, which carry logos related to the presentation resembling characters in the presentation, or that carry logos of sponsors may be given away. The promotional items may be given to the entire audience, to the first predetermined number to arrive, or randomly. In addition, the promotional items can be dropped in coordination with events appearing on screen from nets suspended from the overhead grid at appropriate moments.

Figure 2:
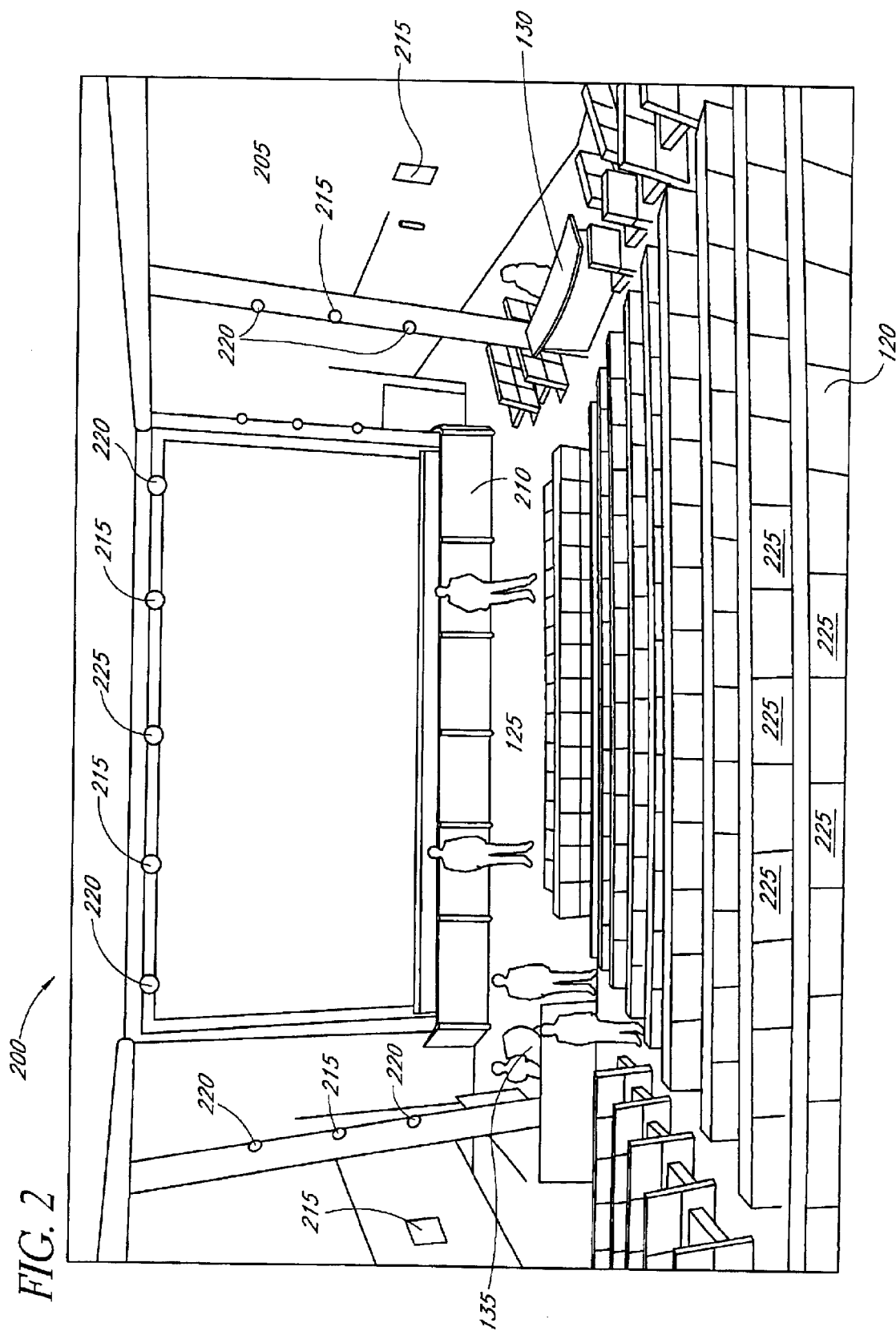
FIG. 2 is a perspective view of a theater, club or auditorium according to one aspect of the present invention.

FIG. 2 is a perspective view of a theater, club or auditorium 200 according to another aspect of the present invention. The theater 100 may be changeably configured with scenic designs and other devices so that the theater interior does not appear to look like a traditional movie theater. The theater 200 can include one or more of the elements described for the theater 100.

The theater 200 can also include scenic elements 205, props 210, special effects machines 215, special effects lights 220, speakers 225, and the like that are supported and positioned in the theater 200. To enhance the realism of an event, the theater 200 can be reconfigured with unique scenic elements 205 that are determined based on the type of performance at the theater 200, e.g., the video content being shown, and that obscure the fact that customers are sitting in the theater 200. For example, for the showing of video content of an outdoor concert, outdoor scenery, including scenic backdrops painted with trees, fields, clouds, a famous outdoor stadium, crowds of people, or the like may be used as the scenic elements 205. Similarly, if a pre-recorded video of a rock concert is being shown in the theater 200, the scenic elements 205 might include banners and pictures of the members of the group. The scenic elements 205 may be ground supported, roof supported, and/or wall supported (as shown in FIG. 2). For the showing of a video of a play, ornate "walls" painted on a fabric may be lowered from the roof supports. The walls may be painted to resemble those of a famous playhouse or may be an original design. If a religious service is to be presented, backdrops and props 210 corresponding to a church, synagogue, temple, mosque, as appropriate, may be used.

In addition, sculptures, statues or mannequins can be used as the scenic elements 205 or the props 210, which can be positioned in or around the communal area 125. For example, cars, planes, trees, architectural elements, such as columns or arches, and the like may be used as the scenic elements 205 or the props 210. Similarly, the dining area 140 and the communal area 125 can be configured with appropriate scenery, such as coconut trees to resemble the famous, historical Coconut Grove nightclub or other nightclub.

The special effects machines 215 might include, for example, fog, mist or rain machines that are positioned to produce a mist on the patrons and the special effects lights 220 might include, for example, lasers, strobe lights or different colored lights that project toward the seats 120 or other places. The speakers 225 can be located overhead or attached to seats 120 in front of the patrons. In addition, the trusses may support catwalks, lighting bridges and a control platform from which sound, lighting and projection equipment may be controlled. Optionally, the sound, lighting, projection, and/or lifting equipment may be computer controlled to automate management of the equipment. Some or all of the elements listed above can instead be mounted to frames positioned substantially parallel to one or more walls.

To further enhance the theater going experience and add to the realism of the event, additional special effects machines 215 are provided. For example, an odor generator can be provided wherein the odor generator disperses mist or the like bearing odor compounds, such as compounds that emulate the smell of hay or fruit trees for more of an outdoors feeling. Further, the odor generator can be coordinated with a video or audio track. For example, if fireworks are exploded in a video sequence, the corresponding burnt smell can be generated at that time by the odor generator. In addition, "snow" making machines can be provided. By way of example, if viewers are watching a skiing event, flurries of snow can be generated at appropriate moments.

In addition, the special effects lights 220 can be computer controlled intelligent lights that are coordinated with the audio or video track of the concert footage. For example, bursts of high intensity lights can be set off in coordination with an on-screen fireworks explosion to simulate the light emitted by the fireworks explosion. The movement and operation of the special effects lights 220 are controlled by codes, e.g., DMX data. In another example, if strobe lights are being pulsed on-screen, strobe lights in the theater 200 can be set to pulse at the same frequency as the on-screen strobe lights. In still another example, when presenting an on-screen athletic competition, lights, strobes, music, and sound effects can be coordinated, such as by pulsing in time, to an audio track playback of an athlete's breathing, heartbeat or footfalls. Lasers can be coordinated to scan or pulse in a pattern similar to lasers in a video sequence. Smoke generators, coordinated with the audio or video track, can also be used to create a rock concert feeling. Further, small, explosive squibs may be used to simulate pyrotechnic sounds and smells.

The speakers 225 can be configured as a surround sound system having at least left front, right front, center, left surround, right surround, and/or rear surround channels to provide a more accurate and realistic reproduction of the audio portion of a screened event. For example, the theater 200 can include a 6 track or more of discrete digital or analog audio or one or more of the Digital Theater Systems (DTS®), the Dolby Digital® system, or the Sony Dynamic Digital Sound® (SDDS) system. In addition, the theater sound system and physical properties may be compatible with THX® guidelines and standards. The speakers 225 can be suspended from the grid and moved as needed for different events and different theater size and shape configurations. Seat vibrators coupled to the sound systems can be used so viewers can better "feel" the sound.

Figure 3:
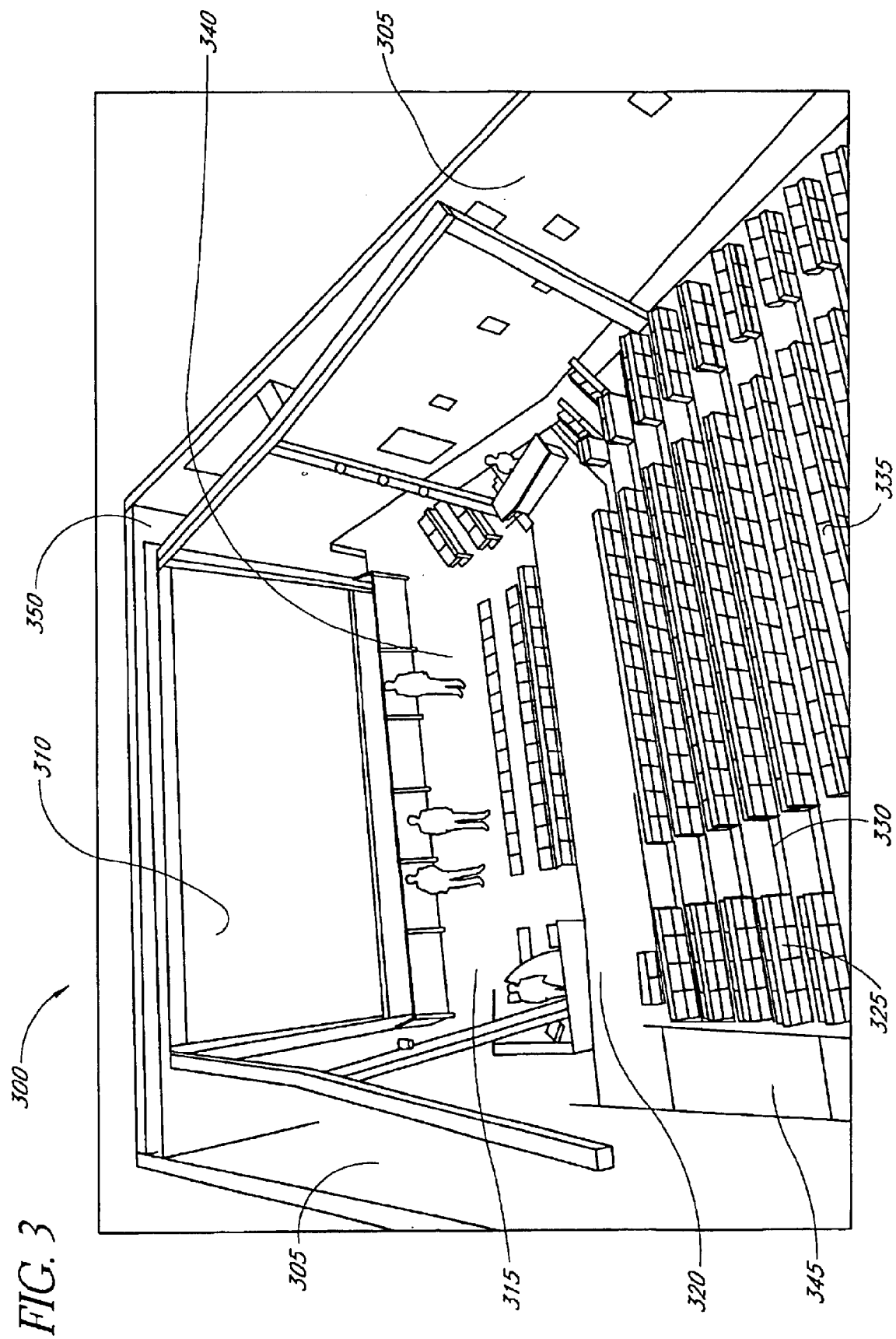
FIG. 3 is a perspective view of a theater, club or auditorium according to one aspect of the present invention.

FIG. 3 is a perspective view of a theater, club or auditorium 300 according to another aspect of the present invention. The theater 300 may be custom built to include some or all of the elements described herein, or the theater 300 may be a standard movie theater modified or converted to include some or all of the elements described herein. The theater 300 may include four walls 305 with one or more projection screens 310 mounted on one or more of the walls 305. One screen 310 can be located at the front of the theater 300, while other screens 310 can be positioned so that attendees will be surrounded on two, three, or four sides by screens 310 and thereby feel more immersed in the presentation.

The theater 300 may include a floor 315 located directly in front of the front screen 310. The floor 315 is flat and sized to provide a stable platform for dancing, movable chairs, and/or tables for dining. Rearward of the flat portion of the floor 315 is a ramped section 320 on which seats 325 are situated to provide good forward visibility. Optionally, instead of the ramped section 320 or further rearward of the ramped section 320, the floor 315 has steps 330 to provide stadium seating. Stadium seating means that the height differential between adjacent steps 330 is large enough to provide a person in a higher row, e.g. the fifth row, to have an adequate view over persons sitting in lower rows, e.g., fourth. The steps 330 may be fixed, as in conventional theaters, or may be created using removable platforms or retractable seats 335 on a flat floor. The use of removable platforms or retractable seats 335 allows the theater 300 to be quickly reconfigured for different type of "events." Thus, for example, if the video being shown is of a band that plays disco music and most of the anticipated customers are likely to dance, some or all of the platforms or retractable seats 335 may be removed to create or extend a dance floor 340. In various configurations, the seating area will hold between 200 and 450 people. Other configurations can have larger or smaller capacity seating areas. In the example illustrations, a ramped entryway 345 is provided toward the rear of the theater 300, though other types of entryways may be used as well.

To further enhance the adaptability of the theater 300, optionally the theater size and shape can be adjusted as needed. Removable dividers, which may be in the form of scenic backdrops, can be suspended from the trusses and can be positioned to modify the theater size and shape. For example, if the video to be shown is of a chamber orchestra or a jazz trio, it may be desirable to create a relatively smaller, more intimate theater space. In such applications, the theater dividers may be moved inward to create the smaller space. By contrast, if a presentation of a large outdoor concert is being shown, then a larger theater space may be desirable and the dividers may be moved accordingly.

In another embodiment, one or more of the theater's 300 non-load bearing walls, as opposed to lowered dividers as described above, may be movable and/or removable so that the size of can be adjusted. In a multi-theater complex (hereinafter "multiplex"), all or portions of one or more theaters 300 may be joined together by moving or removing walls to create a larger or differently shaped space. Alternatively, one theater 300 may be dedicated to providing the enhanced entertainment experience described herein, and other multiplex theaters may be utilized as conventional movie theaters.

To further make theater attendance a fun and realistic experience, a vestibule 350 to the theater 300 can be configured to appear to be the backstage of a venue, such as a rock concert, an opera house, a playhouse, or the like, that corresponds to the event or subject matter of the film being shown. For example, the vestibule 350 may contain a "green room," makeup areas, and dressing rooms for the "performers." The dressing rooms can be decorated with guitars, "personal" photographs, and the like, to correspond to a rock star performing in a concert film being shown. Actors pretending to be members of the rock band can further enhance the experience. Free snacks may be served backstage as well. Thus, when members of the audience arrive, they are greeted with all the excitement of being "backstage." The vestibule may be located at the rear of the theater, behind the front screen, or along either side of the theater. In another embodiment, the "backstage" area is located in front of the screen, in the main portion of the theater 300. Before the main on-screen presentation begins, a backstage on-screen presentation, showing the backs of the on-screen entertainers, can be shown to emulate the backstage feeling. When it is time for the main presentation to begin, the on-screen presentation is "flipped" 180 degrees to show the front of the entertainers to the theater attendees, indicating that the attendees are now the "audience."

Figure 4:
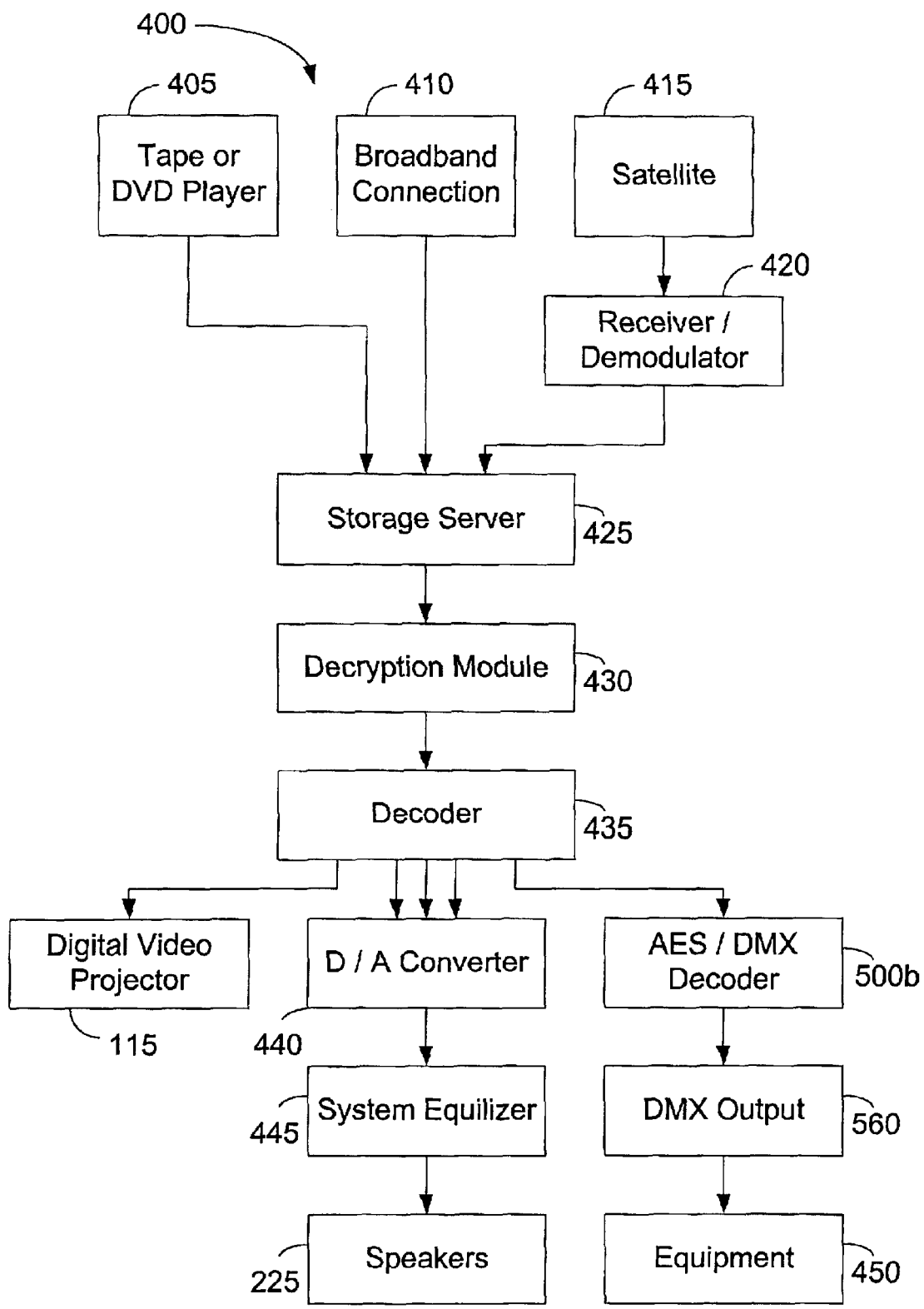
FIG. 4 is a distribution system used to distribute digital content according to one aspect of the present invention.

FIG. 4 is a distribution system 400 used to distribute digital content according to one aspect of the present invention. The analog or digital recording of the live event or performance is typically stored on a storage device such as an analog or digital tape, a digital memory chip or card or a digital video diskette (DVD). In one embodiment, the audio of the event is stored on a first storage device and the video of the event is stored on a second storage device. A tape or DVD player 405 can be used to play the tape or DVD. Optionally, as the live event is being filmed, the content can be sent via a broadband connection 410, e.g., a DSL, T-1 or T-3 line, or can be transmitted to a receiver/demodulator 420 via a satellite dish 415.

The content is typically encrypted using known encryption methods. The encrypted digital data stream is stored on a storage server 425 and sent to the decryption module 430. The encrypted digital data stream is typically decrypted using known decryption methods, e.g., a conditional access decryption method. The digital data stream is then sent to a decoder 435. The decoder 435 parses the digital data stream into a digital audio stream and a digital video stream. The digital video stream is sent to the digital video projector 115 in a particular format, for example, a 292M video format, for projecting the digital video stream on the projection screen 105. The digital video stream can be projected using one or more projectors 115 in one or more projection rooms 110. For a given event, the content may include multiple views of the same event. The multiple views are projected on multiple screens within the theater 100, thereby providing a more exciting and realistic screening of the event.

The digital audio stream is further parsed into four or more AES pairs of digital audio. For example, the first three AES pairs, tracks 1–6, are sent to a D/A converter 440, and the fourth AES pair, tracks 7–8, are sent to the AES/DMX decoder 500b. The D/A converter 440 converts the digital audio stream into six or more channels of analog audio, which are sent to a system equalizer 445 for equalizing the analog audio. From the system equalizer 445, each channel is coupled to an amplifier and then to speaker 225.

The AES/DMX decoder 500b takes the fourth or another AES pair of digital audio, also referred to as the AES digital audio stream, extracts DMX data from the AES digital audio stream, and sends the DMX data to the equipment 450 via a DMX output port (discussed below). The AES digital audio stream has embedded DMX synchronization codes used to automatically coordinate presentation of the media content with lighting, special effects, scenery changes and the like. Thus, for example, the digital video stream can be synchronized with the digital audio stream, which controls the equipment 450 for the theater effects, e.g., the scenic elements 205, props 210, special effects machines 215, special effects lights 220, speakers 225, etc. Upon receiving an appropriate DMX code, the AES/DMX decoder 500b sends the DMX codes to the equipment 450, which then perform as commanded.

If the projector 115 is a standard film projector, cue tapes attached to the film or magnetic tapes synchronized with the film may be used to automatically coordinate the film and the equipment 450 for the theater effects. A cue tape is generally a short strip of metal fastened to the edge of the film at a specific location. At the appropriate time, the film passes two electrical contacts within the projector 115 and the cue tape completes a circuit between the contacts. The completed circuit then triggers a command to be sent to the equipment 450 to perform the specified instruction.

To make the on-screen presentation more realistic, optionally the video might not include any previews, credits or titles during the opening sequences or at the end of the presentation. Instead, the video presents the recorded event as if it were being viewed live, with the on-screen presentation introduced by either an MC or announcer within the video itself, or by a live MC or announcer in the theater 100.

One embodiment of the present invention advantageously provides a certain level of interactivity with the audience. A control system (not shown) can be configured to monitor the audience noise or applause. For example, if the audience applauds louder than a predetermined noise level or for a prolonged period of time at the end of a pre-recorded performance, then the control system sends a command to the storage system 425 to play one or more pre-recorded encores. The number of encores can be related to the loudness or length of the applause. In another example, if the audience is making a great deal of noise during a performance, such as by singing along with a pre-recorded performance, the control system can be configured to adjust, i.e., increase, the volume of the speakers 225 to compensate for the additional noise.

Figure 5:
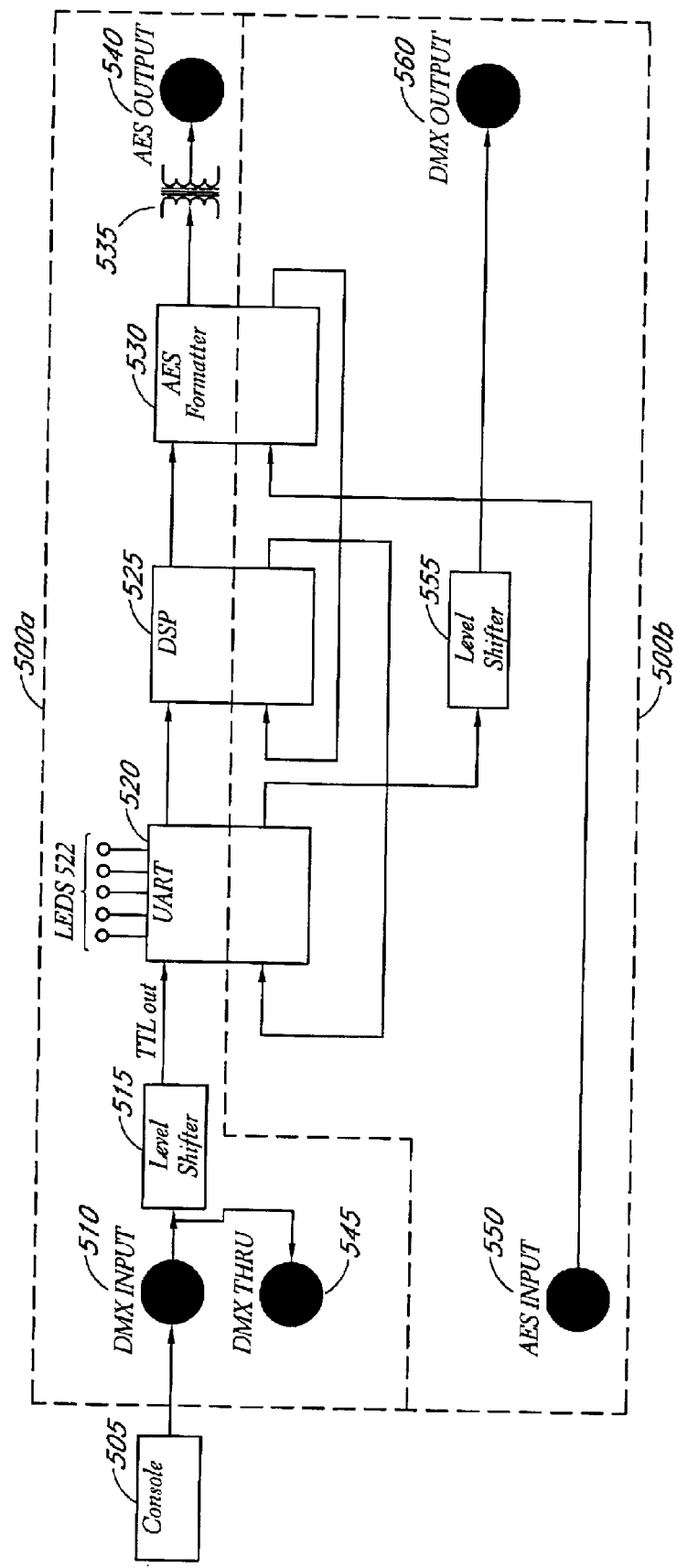
FIG. 5 is a block diagram of a tunneling system according to one aspect of the present invention.

FIG. 5 is a block diagram of a tunneling system 500 according to one aspect of the present invention. The tunneling system 500 is a system that is used to add, embed or record the original pre-recorded digital audio stream with codes, e.g., lighting data or queues, etc., that control the equipment 450 for the theater effects. In other words, the tunneling system 500 provides a system that is used to make the standard Audio Engineering Society (AES)/European Broadcasting Union (EBU) audio channels hold codes such as lighting data to enhance the entertainment experience. Hence, the codes are typically placed on the audio portion or track of the digital audio stream.

The tunneling system 500 allows an entertainment designer the ability to uniquely design each performance by incorporating various codes into the digital audio stream to provide additional scenes, props, special effects, lights, sounds, and music in the theater 100. In one embodiment, using a lighting control console 505 such as the Whole Hog II, the entertainment designer can view and listen to the original analog or digital audio and video stream while simultaneously adding lighting queues to the digital audio stream. Thus, once the lighting queues are added to the digital audio stream, the AES digital audio stream can be played back in the theater 100 without any human controlling the movement, color, intensity and timing of the lights during the performance. Furthermore, the AES digital audio stream avoids humans from having to attempt to synchronize the lights with the audio and video of the performance.

The tunneling system 500 includes an encoder 500a, which is typically located in the production studio (full size replication of a movie theater) and is used to create the AES digital audio stream, and a decoder 500b, which is typically located in every theater 100 and is used to play back the AES digital audio stream. The encoder 500a includes a DMX input 510, a level shifter 515, a Universal Asynchronous Receiver and Transmitter (UART) 520, a Digital Signal Processor (DSP) 525, an AES formatter 530, a transformer 535, an AES output 540, and a DMX thru-output 545. The encoder 500*a* can also be referred to as an embedding module, or DMX to AES encoder. The decoder 500*b* includes an AES input 550, the UART 520, the DSP 525, the AES formatter 530, a level shifter 555, and a DMX output 560. The decoder 500*b* can also be referred to as an AES to DMX decoder.

Figure 6:
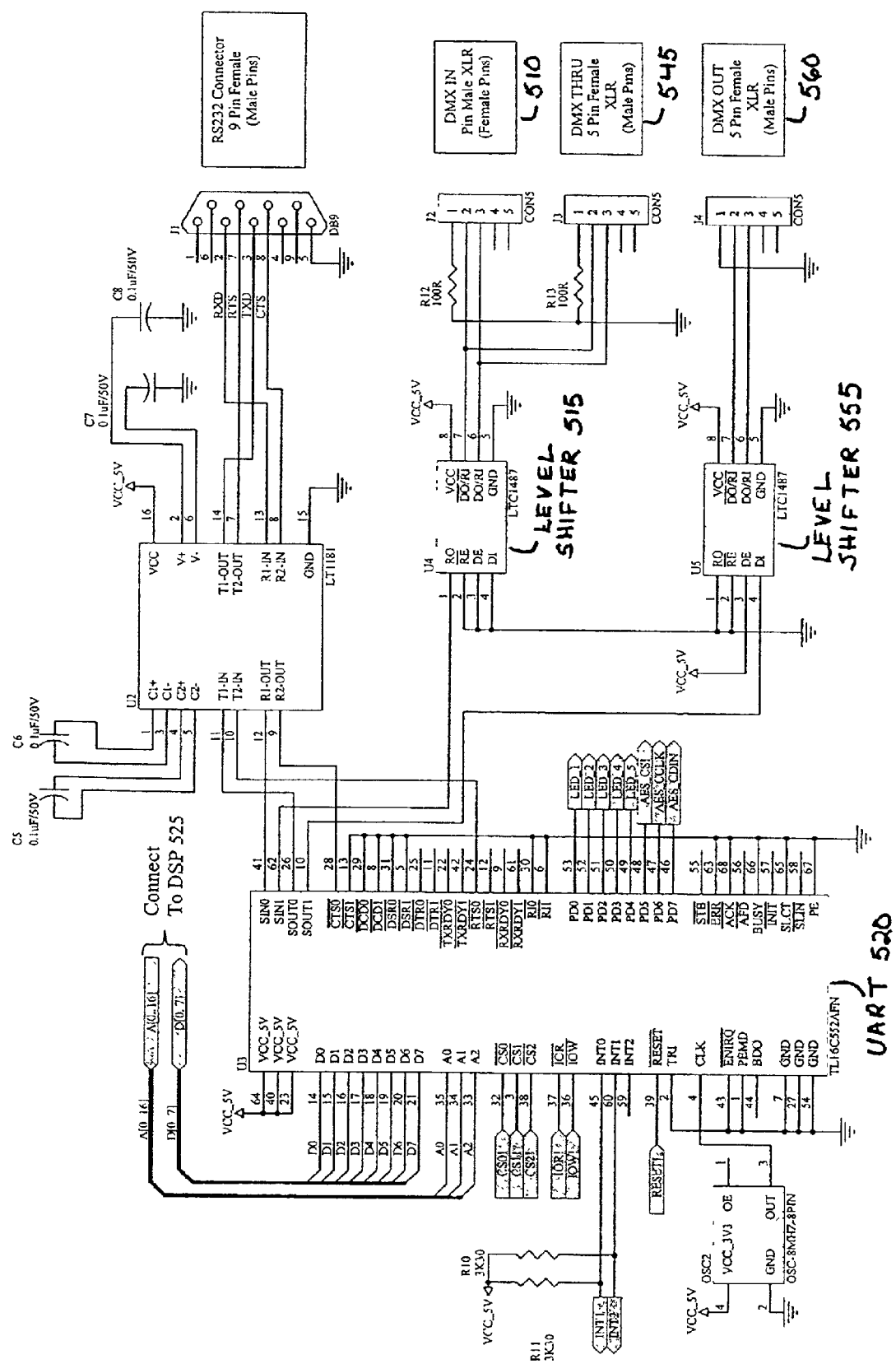
FIG. 6 is a schematic diagram showing the connections and layout of a DMX input, two level shifters, a UART, a DMX thru-output, and a DMX output according to one aspect of the present invention.

FIG. 6 is a schematic diagram showing the connections and layout of the DMX input 510, the level shifter 515, the UART 520, the DMX thru-output 545, the level shifter 555, and the DMX output 560. In one embodiment, the level shifter 515, 555 is one manufactured by Linear Technologies, model number LTC1487. The UART 520 is one manufactured by Texas Instruments, model number TL16C552AFN. One of ordinary skill in the art will understand that other similar level shifters and UART can be used while still maintaining the spirit and scope of the present invention.

Figure 7:
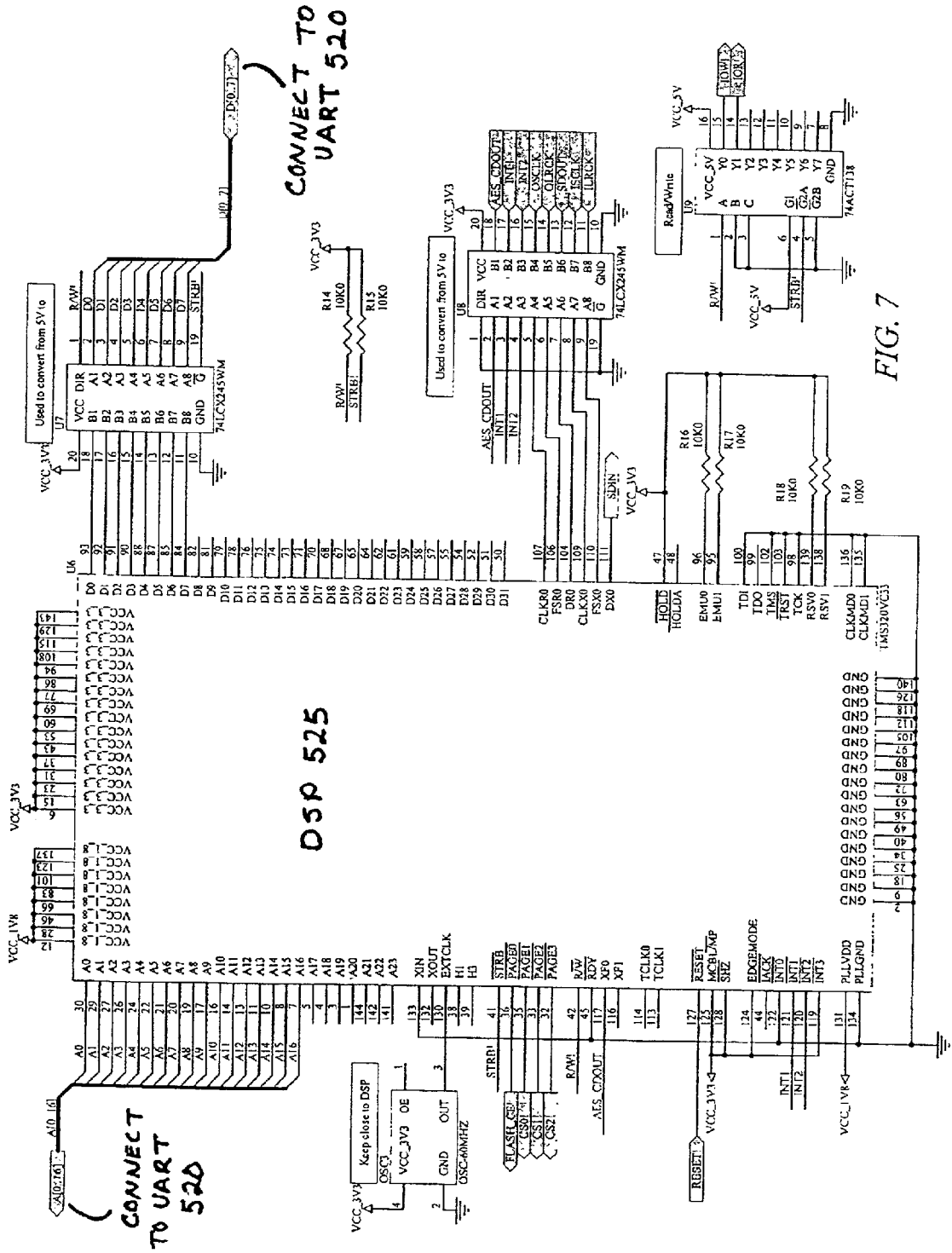
FIG. 7 is a schematic diagram showing the connections and layout of a DSP according to one aspect of the present invention.

FIG. 7 is a schematic diagram showing the connections and layout of the DSP 525. In one embodiment, the DSP 525 is one manufactured by Texas Instruments, model number TMS320VC33. One of ordinary skill in the art will understand that other similar DSPs can be used while still maintaining the spirit and scope of the present invention.

Figure 8:
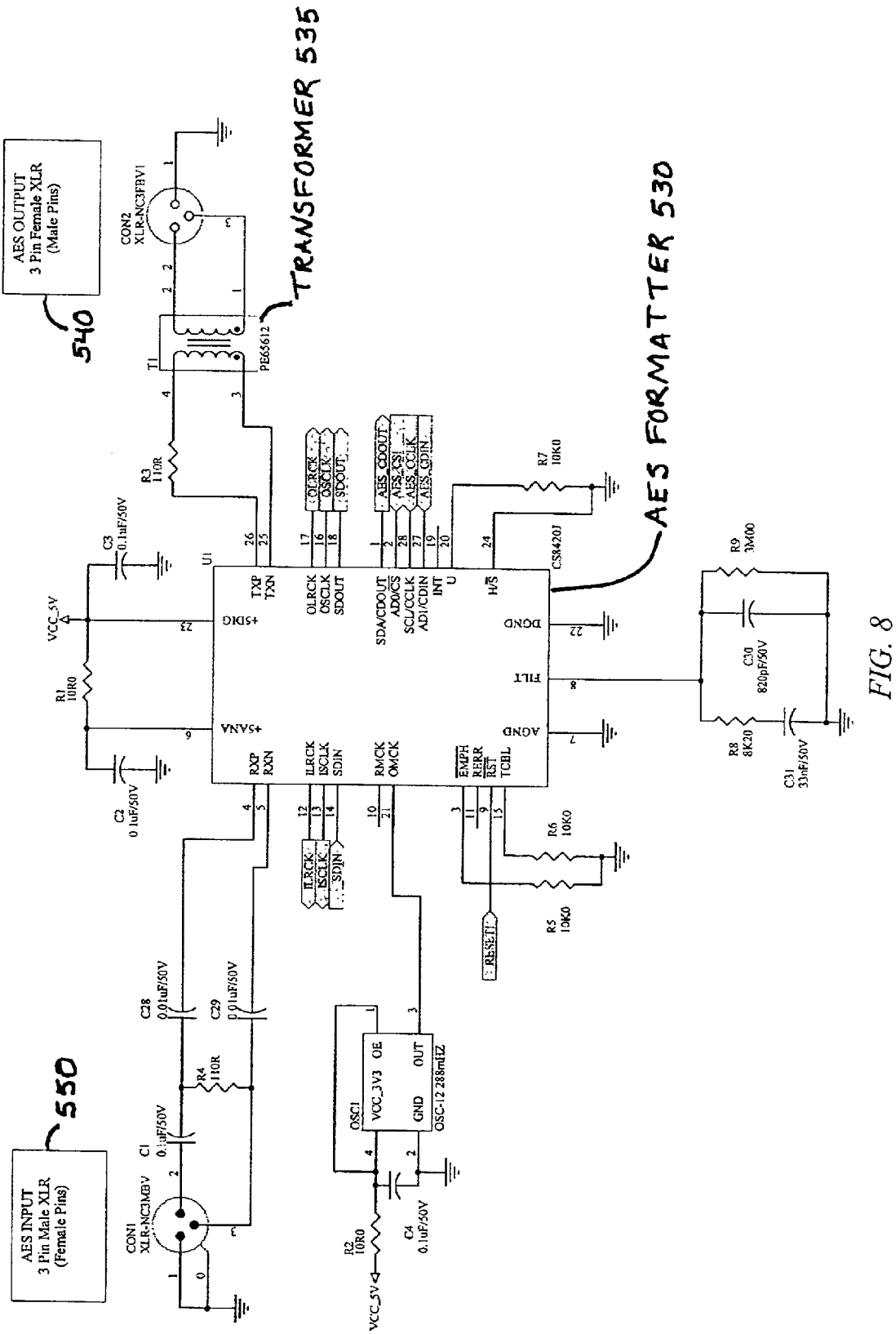
FIG. 8 is a schematic diagram showing the connections and layout of an AES formatter and a transformer according to one aspect of the present invention.

FIG. 8 is a schematic diagram showing the connections and layout of the AES formatter 530 and the transformer 535. In one embodiment, the AES formatter 530 is one manufactured by Cirrus Logic, model number CS8420J. The transformer 535 is one manufactured by Pulse Engineering, model number PE65612. One of ordinary skill in the art will understand that other similar formatters and transformers can be used while still maintaining the spirit and scope of the present invention.

As shown in FIGS. 5–8, the encoder 500*a* and the decoder 500*b* can utilize some or all of the same circuit components, thus providing a more robust design.

Figure 9:
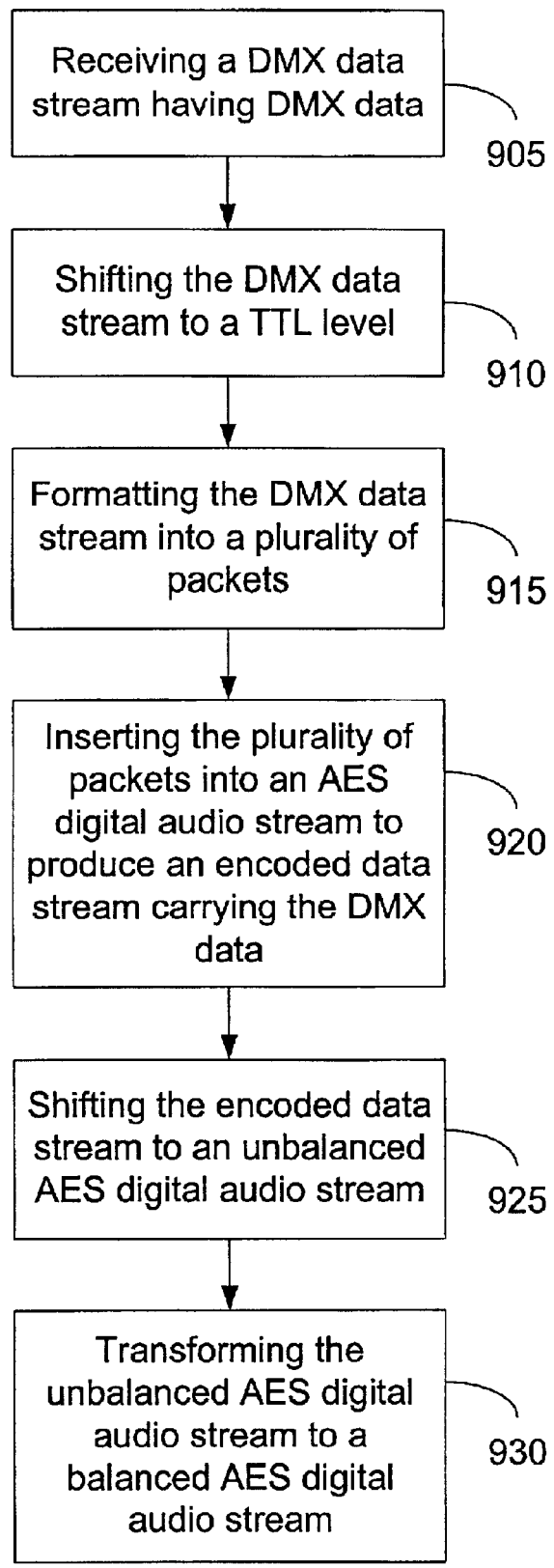
FIG. 9 is a simplified flow chart of the operations of the DMX/AES encoder of FIG. 5 according to one aspect of the present invention.
Figure 10:
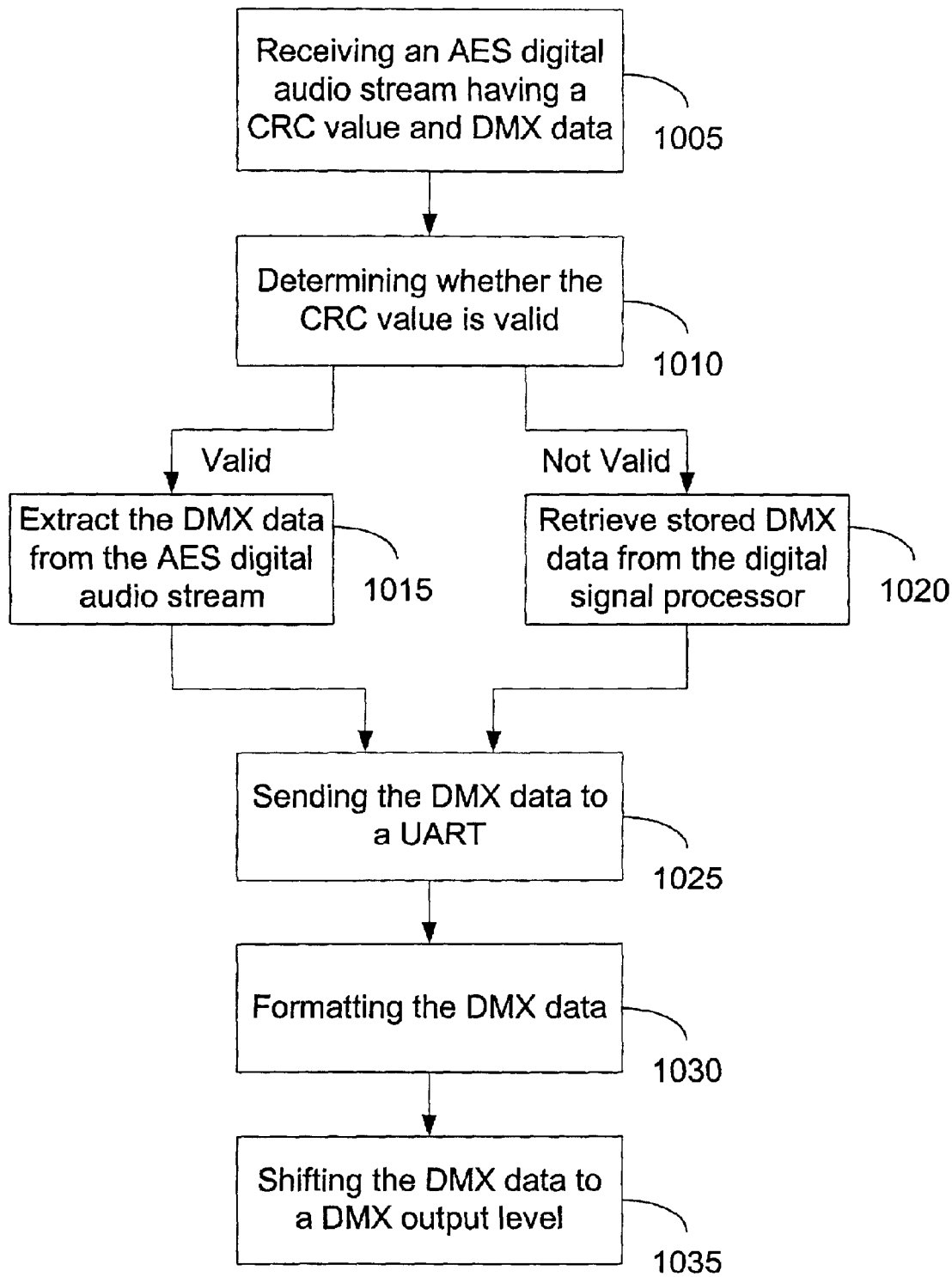
FIG. 10 is a simplified flow chart of the operations of the AES/DMX decoder of FIG. 5 according to one aspect of the present invention.

FIG. 9 is a simplified flow chart of the operations of the DMX/AES encoder and FIG. 10 is a simplified flow chart of the operations of the AES/DMX decoder. References to FIGS. 9 and 10 will be made in the discussion of FIG. 5.

Referring back to FIG. 5, the DMX input 510 is connected to the lighting control console 505. To begin adding the DMX codes to the original AES/EBU video, the entertainment designer uses the lighting control console 505 to select, while the digital video stream is being played, which codes and when the codes are to be placed in the digital audio stream. For example, as the digital video stream is being played on the lighting control console 505, the entertainment designer selects the codes that are to be stored in the digital audio stream. Each code represents one or more operations to be performed by the equipment 450. The codes are stored in the lighting control console 505. The DMX input 510 is configured to receive the digital audio stream having DMX codes or data (state 905). Hence, the recording of the codes is synchronized with the digital video stream.

The DMX thru-output 545 is configured to connect to the equipment in the production studio so the entertainment designer can view, feel, and listen to the created effects. The equipment in the production studio is similar to the equipment 455 in the theater 100 and provides the entertainment designer with a realistic, real-time representation of the created effects. For example, if one red light is selected to turn on at the beginning of the video, the entertainment designer can view the red light turning on in the production studio after the selection has been made.

Once the codes have been inserted into the digital audio stream, the level shifter 515 receives the digital audio stream and shifts the digital audio stream to a Transistor-Transistor-Logic (TTL) level (state 910). The UART 520 is configured to format or parse the digital audio stream into a plurality of packets of approximately equal size (state 915).

The DSP 525 is configured to request and receive the plurality of packets from the UART 520. The DSP 525 is also configured to insert the plurality of packets into an AES digital audio stream to produce an encoded data stream carrying the DMX codes (state 920). For each DMX code, the DSP 525 creates a Cyclic Redundancy Code (CRC) code and merges the CRC code into the plurality of packets. Hence, a number of codes are embedded into each of the plurality of packets.

The DSP 525 is also configured to store a plurality of DMX codes representing pre-programmed scenes, props, special effects, lights, sounds, and music. Therefore, rather than receiving the codes from the UART 520, the DSP 525 can retrieve the plurality of pre-programmed codes from memory, creates the CRC codes, and merge the CRC codes into the plurality of packets. In one embodiment, the DSP 525 is configured to store a plurality of pre-programmed test codes representing a pre-programmed test for the equipment. The pre-programmed test codes provide codes that instruct the equipment 450 to operate in the theater 100 to ensure the equipment 450 is operating and functioning correctly.

Furthermore, the DSP 525 is configured to store a plurality of scaler DMX codes for each theater. For example, the scaler DMX codes can include the range of motion for each light, the maximum intensity for each light, the maximum volume for the speakers 225, maximum rate of fog dispersed from each fog machine, etc. Using the scalers, the DSP 525 can verify if the code is within the specified parameter and, if not, the DSP 525 can adjust the code accordingly.

The AES formatter 530 is configured to shift the encoded data stream to an unbalanced AES digital audio stream (state 925). The AES formatter 530 is also configured to generate the AES digital audio stream or receive the AES digital audio stream from the AES input port 550. An AES word clock signal that is derived from the AES input port can be send to the AES formatter 530 for synchronizing the output of the AES formatter 530. The transformer 535 is configured to transform the unbalanced AES digital audio stream to a balanced AES digital audio stream (state 930).

Once the AES digital audio stream having at least one CRC code and DMX codes has been created, each theater 100 can decode the DMX codes from the AES digital audio stream using the AES/DMX decoder 500*b*. The AES digital audio stream might be stored on a server that is located at each theater 100. The server has an output for the AES digital audio stream that is connected to the AES input port 550 of the AES/DMX decoder 500*b*. The AES input 550 is connected to the AES formatter 530, which is configured to receive the AES digital audio stream having the CRC code and the DMX data (state 1005). The AES formatter 530 is further configured to verify that the AES digital audio stream is a valid AES stream and to convert the AES digital audio stream to a TTL level. Thereafter, the AES formatter 530 sends the AES digital audio stream to the DSP 525.

The DSP 525 is configured to receive the AES digital audio stream and to determine whether the CRC code is valid (state 1010). Determining the validity of the CRC code ensures that the DMX codes within the AES digital audio stream are not corrupt. If the CRC code is valid, the DSP 525 extracts the DMX data from the AES digital audio stream (state 1015). If the CRC code is not valid, the DSP 525 retrieves stored DMX data from the memory of the DSP 525 (state 1020). The memory of the DSP 525 stores a plurality of DMX codes that are pre-programmed. Each pre-programmed plurality of DMX code represents a particular scene. The DSP 525 is also configured to connect to an RS 232 cable, which can be connected to a computer that can be used to download the DMX codes to the memory of the DSP 525. The DSP 525 is also configured to send the DMX codes to the UART 520 (state 1025).

The UART 520 is configured to format the DMX codes and transmits the DMX codes to the level shifter 555 at specific times (state 1030). The level shifter 555 is configured to shift the formatted DMX codes to a DMX output level (state 1035) and to send the DMX codes to the DMX output 560, which is coupled to the equipment 450 (see also FIG. 4). The DMX codes are sent to the equipment 450 to perform functions and operations represented by the DMX codes.

Thus, as described above, the present invention provides an enhanced, event-based theater going experience. A theater configured in accordance with the present invention permits screenings of pre-recorded videos of live performances to be reproduced with such realism that the audience feels as if they are at the actual live event.

Although this invention has been described in terms of certain preferred embodiments, other embodiments that are apparent to those of ordinary skill in the art are also within the scope of this invention.

What is claimed is:

1. A modified movie theater having a projection screen, comprising:
   a digital projector configured to project digital sequences onto the projection screen;
   a plurality of seats positioned between the projection screen and the digital projector;
   at least a first support structure positioned at the side of the projection screen;
   a plurality of special effects systems connected to the first support structure and configured to operate during the projection of the image sequences and, in response to code embedded in digital media associated with the image sequence, in synchronization with the image sequences so as to simulate being present at a live event; and
   a communal area positioned between the projection screen and the plurality of seats and configured to provide an open space for people to dance.

2. The modified movie theater as defined in claim 1, further comprising movable plops suspended from at least a first support structure.

3. The modified movie theater as defined in claim 1, further comprising a backstage area located behind the projection screen, the backstage area configured to simulate the backstage of a live concert venue.

4. The modified movie theater as defined in claim 1, further comprising a master of ceremonies station positioned adjacent to the plurality of seats.

5. The modified movie theater as defined in claim 1, further comprising a lounge positioned adjacent to the plurality of seats.

6. The modified movie theater as defined in claim 1, further comprising a bar positioned adjacent to the communal area.

7. The modified movie theater as defined in claim 1, wherein the image sequences are of a live concert.

8. The modified movie theater as defined in claim 1, wherein the image sequences are of a recorded concert.

9. The modified move theater as defined in claim 1, wherein the image sequences are of a sporting event.

10. The modified movie theater as defined in claim 1, wherein the special effects systems include synchronized lights.

11. The modified movie theater as defined in claim 1, wherein special effects systems include synchronized fog machines.

12. The modified movie theater as defined in claim 1, wherein the plurality of seats are adaptably positioned to simulate a plurality of venues.

* * * * *